United States Patent
Shiu et al.

(10) Patent No.: US 10,486,276 B2
(45) Date of Patent: Nov. 26, 2019

(54) SECURING STRUCTURE AND SLIDING MECHANISM

(71) Applicant: Wistron Corp., New Taipei (TW)

(72) Inventors: Meng-Chian Shiu, New Taipei (TW); Chi-Jen Lo, New Taipei (TW)

(73) Assignee: WISTRON CORP., New Taipei (TW)

( * ) Notice: Subject to any disclaimer, the term of this patent is extended or adjusted under 35 U.S.C. 154(b) by 148 days.

(21) Appl. No.: 15/914,982

(22) Filed: Mar. 7, 2018

(65) Prior Publication Data

US 2019/0134765 A1 May 9, 2019

(30) Foreign Application Priority Data

Nov. 7, 2017 (TW) .............................. 106216514 U (51) Int. Cl.
  *B23Q 1/28* (2006.01)
  *H02B 1/052* (2006.01)
  *H01R 9/26* (2006.01)
  *B23Q 1/46* (2006.01)

(52) U.S. Cl.
  CPC ................. *B23Q 1/28* (2013.01); *B23Q 1/46* (2013.01); *H01R 9/2608* (2013.01); *H02B 1/0523* (2013.01); *H02B 1/0526* (2013.01)

(58) Field of Classification Search
  CPC ... B23Q 1/00; B23Q 1/28; B23Q 1/58; B23Q 3/00
  See application file for complete search history.

(56) References Cited

U.S. PATENT DOCUMENTS

| 5,499,802 A * | 3/1996 | Haberle | ................. B23Q 3/102 269/235 |
| 2011/0318134 A1* | 12/2011 | Ikuno | .................... F16B 13/068 411/49 |
| 2013/0067849 A1* | 3/2013 | Espinosa | ............... E04B 1/4121 52/699 |
| 2014/0157717 A1* | 6/2014 | Espinosa | ............... E04B 1/4114 52/700 |
| 2018/0223891 A1* | 8/2018 | White | ....................... G01K 1/14 |
| 2019/0134765 A1* | 5/2019 | Shiu | ......................... B23Q 1/28 |

\* cited by examiner

*Primary Examiner* — Lee D Wilson (57) ABSTRACT

A securing structure is provided, including a frame, a movable member, a fixed member, a first abutting member, a screwing member. The frame includes a passage. The movable member is slidably disposed in the passage, and includes a threaded portion and a guiding slot. The fixed member is affixed on the frame and extends through the guiding slot. The first abutting member has a first inclined surface and is pivotally connected to the movable member. The screwing member is detachably joined to the threaded portion.

18 Claims, 11 Drawing Sheets

SECURING STRUCTURE AND SLIDING MECHANISM

CROSS REFERENCE TO RELATED APPLICATIONS

The present application is based on, and claims priority from, Taiwan Patent Application No. 106216514, filed on Nov. 7, 2017, the disclosure of which is hereby incorporated by reference herein in its entirety.

BACKGROUND OF THE INVENTION

Field of the Invention

The application relates in general to a sliding mechanism, and in particular, to a sliding mechanism having a securing structure.

Description of the Related Art

Many apparatuses or devices comprise a slider and a rail. When the slider moves along the rail to a predetermined position, a screw is usually used to affix it by extending through the rail from the bottom. However, it is difficult to dispose and tighten up the screw when the space below the rail is limited. Therefore, how to address the aforementioned problem has become an important issue.

BRIEF SUMMARY OF INVENTION

To address the deficiencies of conventional products, an embodiment of the invention provides a securing structure, including a frame, a movable member, a fixed member, a first abutting member, a screwing member. The frame includes a passage. The movable member is slidably disposed in the passage, and includes a threaded portion and a guiding slot. The fixed member is affixed on the frame and extends through the guiding slot. The first abutting member has a first inclined surface and is pivotally connected to the movable member. The screwing member is detachably joined to the threaded portion.

In some embodiments, the securing structure further comprises a first elastic member connected to the frame.

In some embodiments, when the movable member moves relative to the screwing member from a first position to a second position, the fixed member pushes the first abutting member, and the first abutting member rotates relative to the movable member along a first direction.

In some embodiments, the securing structure further comprises a second elastic member connected to the movable member and the first abutting member, wherein when the movable member moves relative to the screwing member from the second position to the first position, the first abutting member rotates along a second direction by an elastic force from the second elastic member, and the second direction is opposite to the first direction.

In some embodiments, the movable member further comprises a stopping member for restricting the rotation range of the first abutting member.

In some embodiments, the securing structure further comprises a second abutting member, comprising a second inclined surface and pivotally connected to the movable member, wherein when the movable member moves relative to the screwing member from a first position to a second position, the first abutting member rotates relative to the movable member along a first direction, and the second abutting member rotates relative to the movable member along a second direction opposite to the first direction.

In some embodiments, the movable member is positioned between the first abutting member and the second abutting member.

In some embodiments, the securing structure further comprises a second elastic member connected to the movable member and the second abutting member, wherein when the movable member moves relative to the screwing member from the second position to the first position, the second abutting member rotates along the first direction by an elastic force from the second elastic member.

An embodiment of the invention further provides a sliding mechanism, comprising a housing having a rail, a moving module, and the aforementioned securing structure. The frame is extended through the rail, and the screwing member is extended through the moving module.

In some embodiments, the moving module comprises a recess, and at least a portion of the frame enters the recess.

In some embodiments, the recess further comprises a second positioning surface for preventing the rotation of the frame relative to the moving module.

In some embodiments, the moving module comprises a protrusion, and the housing further comprises a depression portion, wherein the protrusion is accommodated in the depression portion.

In some embodiments, the depression portion is substantially parallel to the rail.

In some embodiments, the moving module comprises a plurality of movable blocks, detachably connected to each other.

In some embodiments, when the movable member moves relative to the screwing member from a first position to a second position, the first inclined surface contacts the housing.

In some embodiments, when the movable member moves relative to the screwing member from the first position to an intermediate position, the first inclined surface is substantially parallel to a bottom surface of the housing, and a gap is formed between the first inclined surface and the housing, wherein the intermediate position is positioned between the first position and the second position.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The embodiments of the securing structure and the sliding mechanism having the securing structure are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
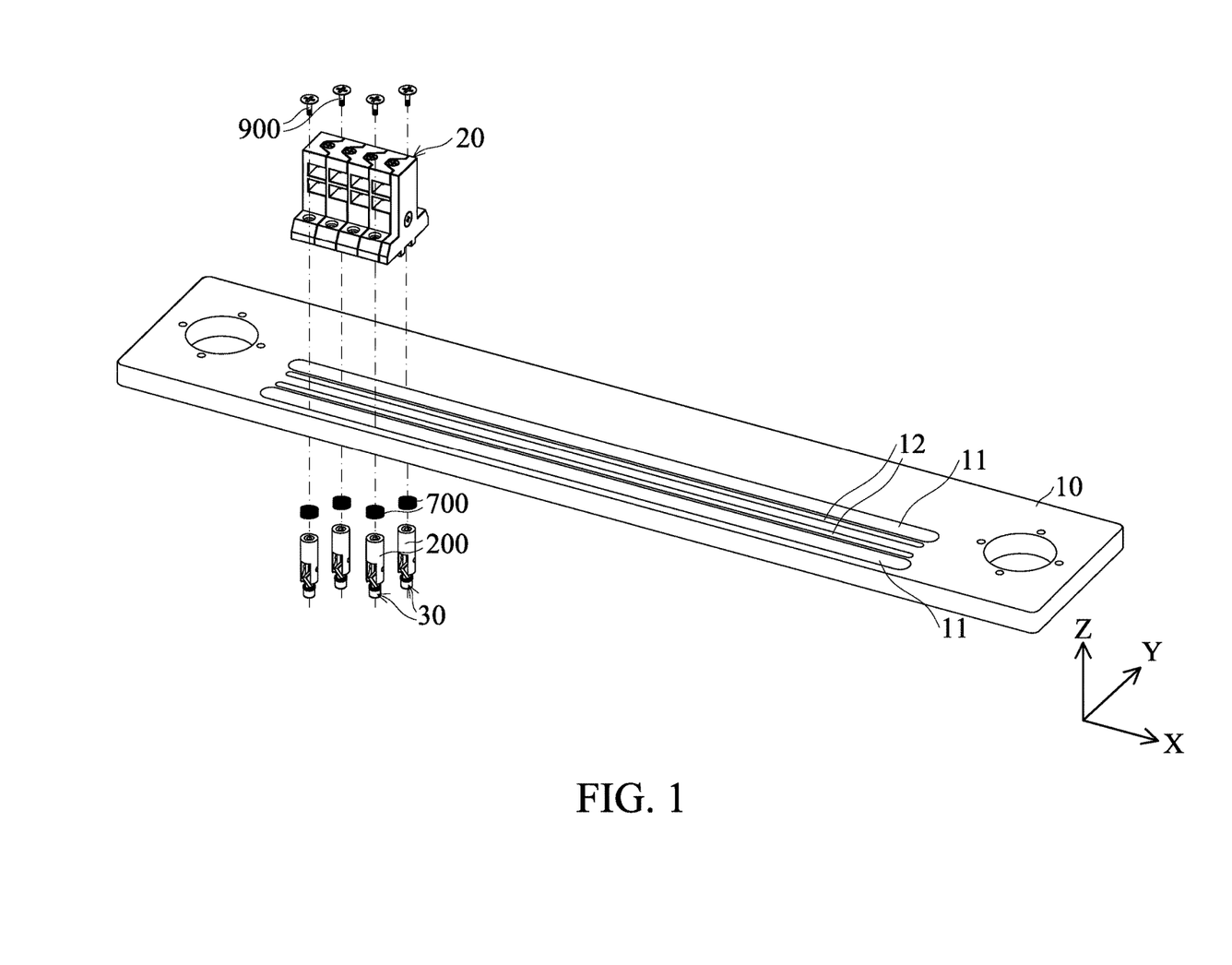
FIG. 1 is a schematic diagram of a sliding mechanism according to an embodiment of the invention.

FIG. 1 is a schematic diagram of a sliding mechanism according to an embodiment of the invention. The sliding mechanism comprises a housing 10, a moving module 20, and at least one securing structure 30. The housing 10 has at least one rail 11. The moving module 20 is slidably disposed on the rail 11, and can be affixed to any position of the rail 11 by the securing structure 30.

Figure 2A:
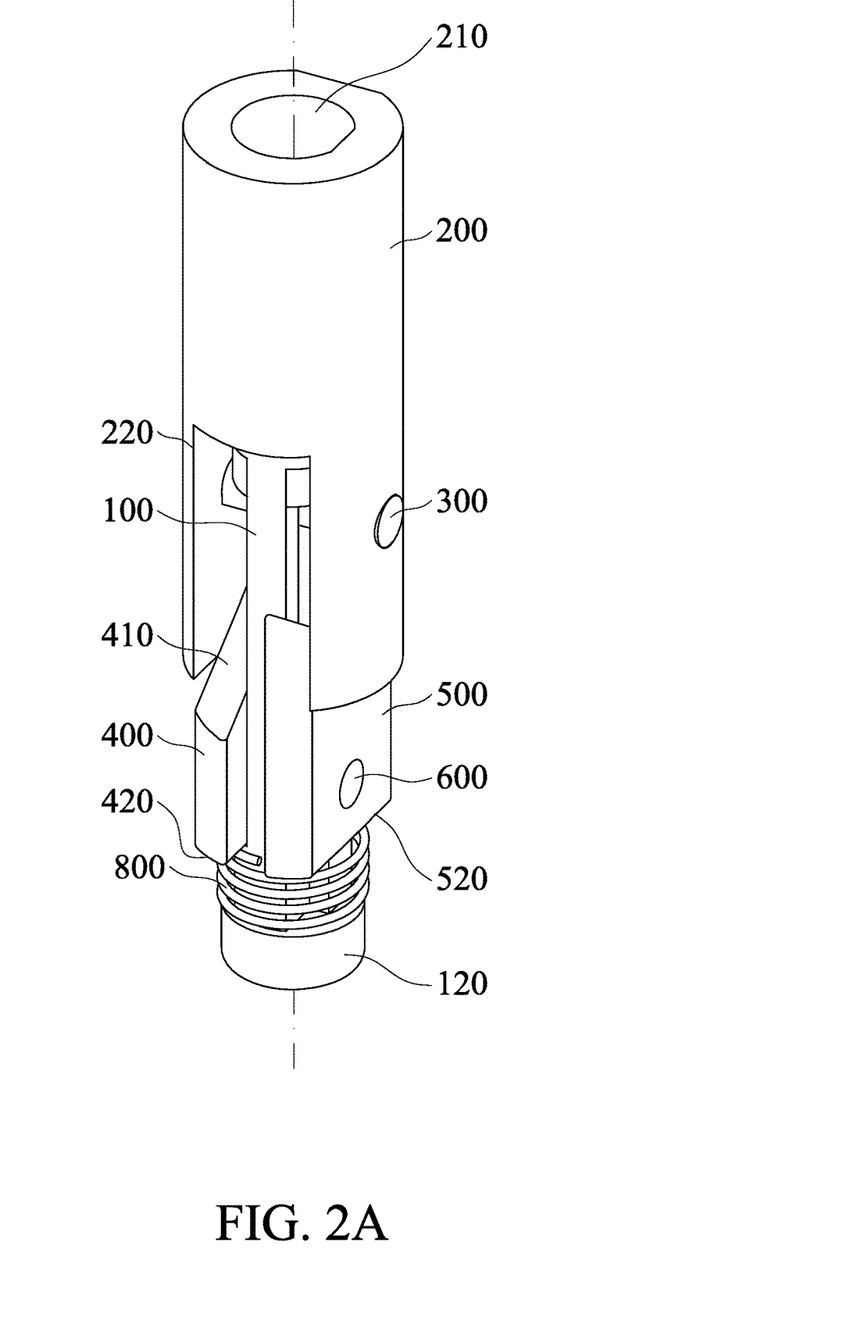
FIG. 2A is a schematic diagram of some components of a securing structure according to an embodiment of the invention.
Figure 2B:
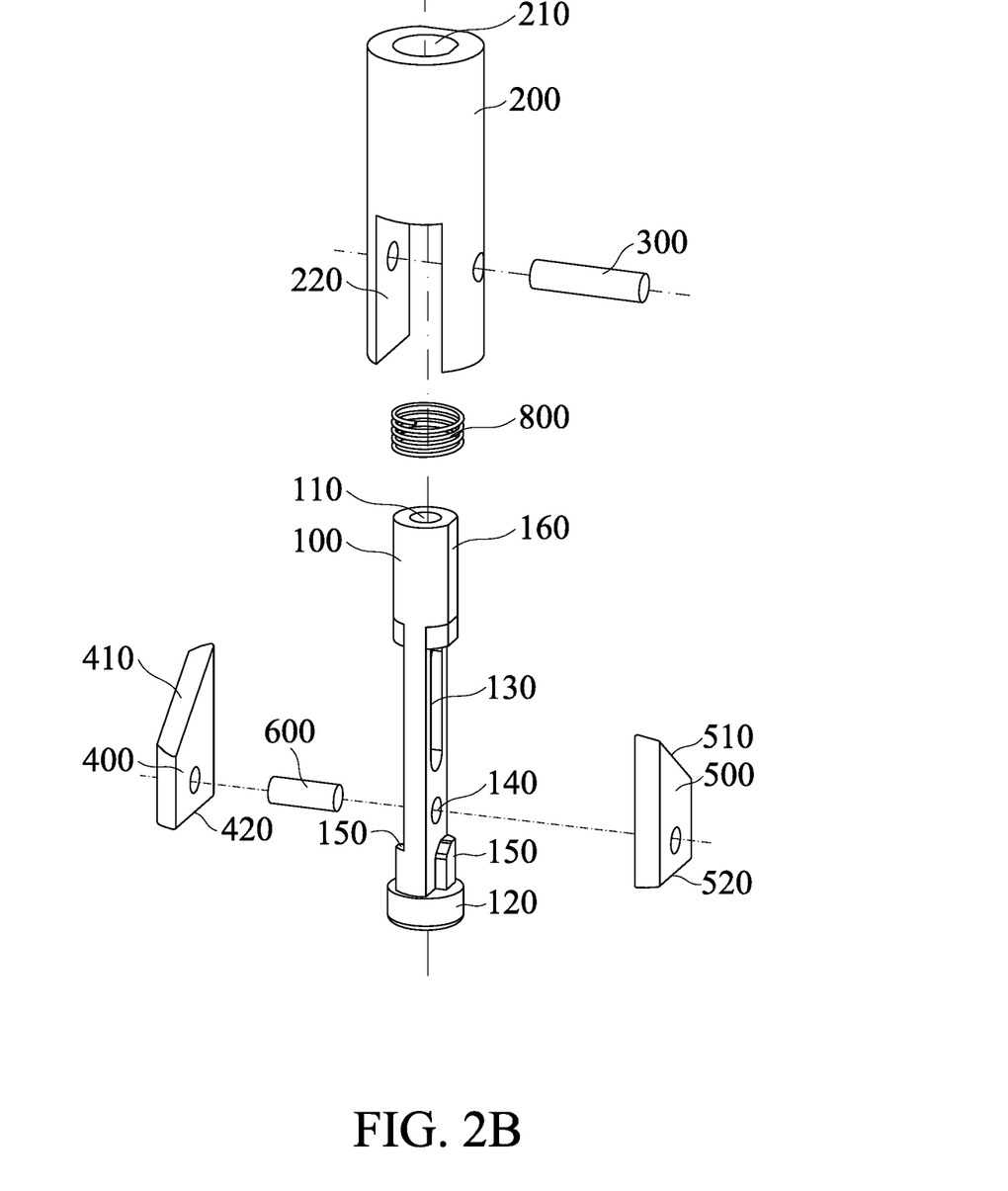
FIG. 2B is an exploded-view diagram of some components of the securing structure shown in FIG. 2A according to an embodiment of the invention.

As shown in FIGS. 1, 2A and 2B, the securing structure 30 primarily comprises a movable member 100, a frame 200, a fixed member 300, a first abutting member 400, a second abutting member 500, a hinge 600, a first elastic member 700, a second elastic member 800, and a screwing member 900.

The movable member 100 has a threaded portion 110, a disk-shaped portion 120, a guiding slot 130, a pivot hole 140, and at least one stopping portion 150. The threaded portion 110 and the disk-shaped portion 120 are respectively formed on the opposite ends of the movable member 100, and the threaded portion 110 can be joined to the screwing member 900. The guiding slot 130 and the pivot hole 140 are formed between the threaded portion 110 and the disk-shaped portion 120, and the guiding slot 130 is extended along the longitudinal direction of the movable member 100. In this embodiment, the pivot hole 140 is positioned between the guiding slot 130 and the disk-shaped portion 120, and the movable member 100 further includes a first positioning surface 160.

The frame 200 has a passage 210 and two openings 220. The movable member 100 can be extended through the passage 210 and slidably disposed therein. Since the appearance and the dimensions of the passage 210 substantially correspond to that of the movable member 100, the first positioning surface 160 can restrict the orientation of the movable member 100 when entering the passage 210, and avoid the rotation of the movable member 100 relative to the frame 200.

The fixed member 300 is affixed to the frame 200 and extends through the guiding slot 130 of the movable member 100. Furthermore, the fixed member 300 is exposed from the openings 220.

Referring to FIGS. 1, 2A and 2B, in this embodiment, the first abutting member 400 is substantially trapezoidal, and includes a first inclined surface 410 and a surface 420 opposite to the first inclined surface 410. Similarly, the second abutting member 500 is substantially trapezoidal, and includes a second inclined surface 510 and a surface 520 opposite to the second inclined surface 510. The hinge 600 can be extended through the pivot hole 140 of the movable member 100 and pivotally connected to the first abutting member 400 and the second abutting member 500 at its opposite ends. The movable member 100 is positioned between the first abutting member 400 and the second abutting member 500. Specifically, the first inclined surface 410 and the second inclined surface 510 slant to the opposite direction.

The first elastic member 700 is connected to the frame 200, so as to apply the elastic force to the frame 200. The second elastic member 800 is connected to the movable member 100 and the first and second abutting members 400 and 500, so as to apply the elastic force to the first abutting member 400 and the second abutting member 500. In this embodiment, both the first elastic member 700 and the second elastic member 800 are compression springs. The second elastic member 800 can surround the movable member 100 and be connected to the disk-shaped portion 120 and the surfaces 400 and 500 of the first and second abutting members 400 and 500. In some embodiments, the second elastic member 800 is a torsion spring.

Figure 3A:
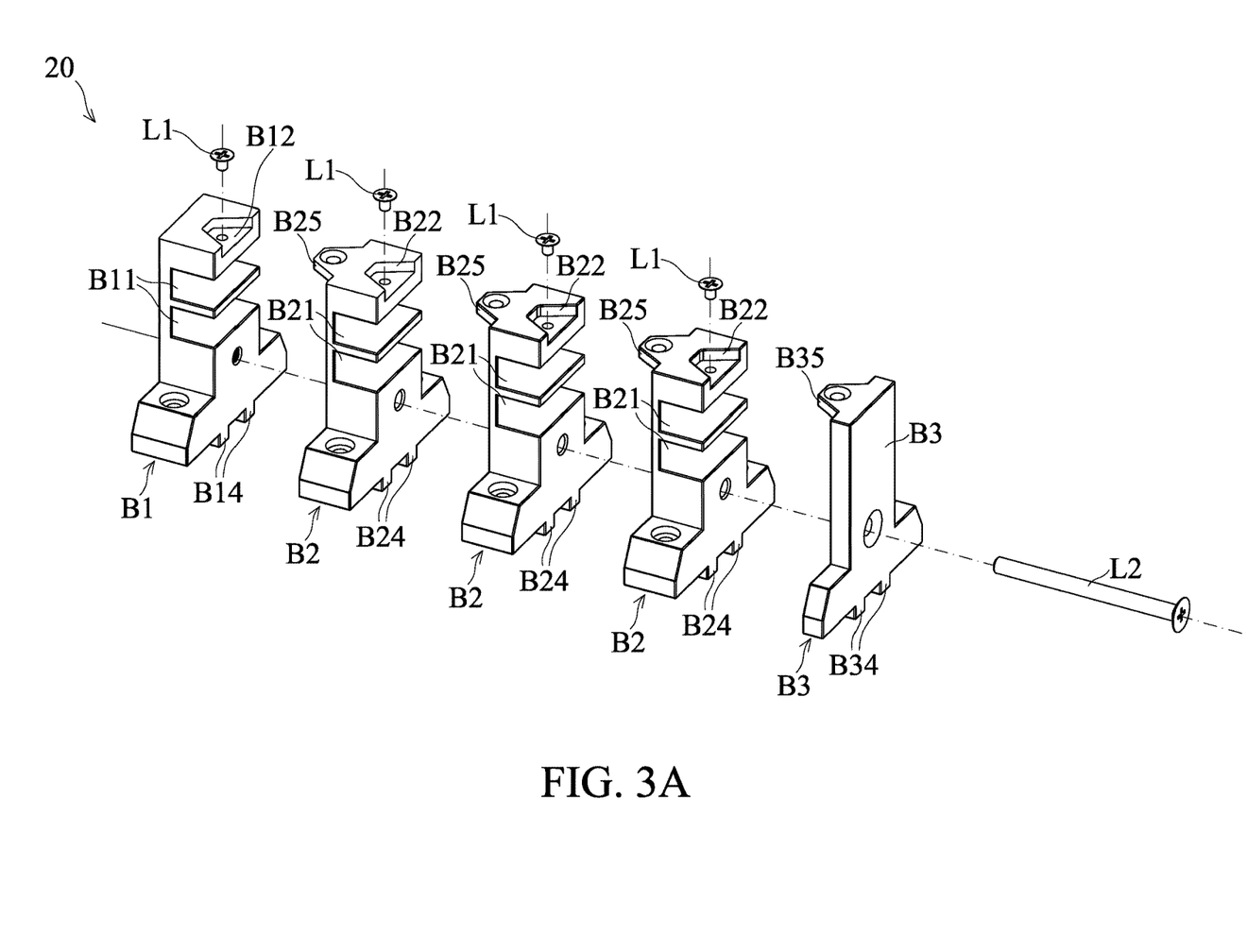
FIG. 3A is a schematic diagram of a moving module according to an embodiment of the invention.
Figure 3B:
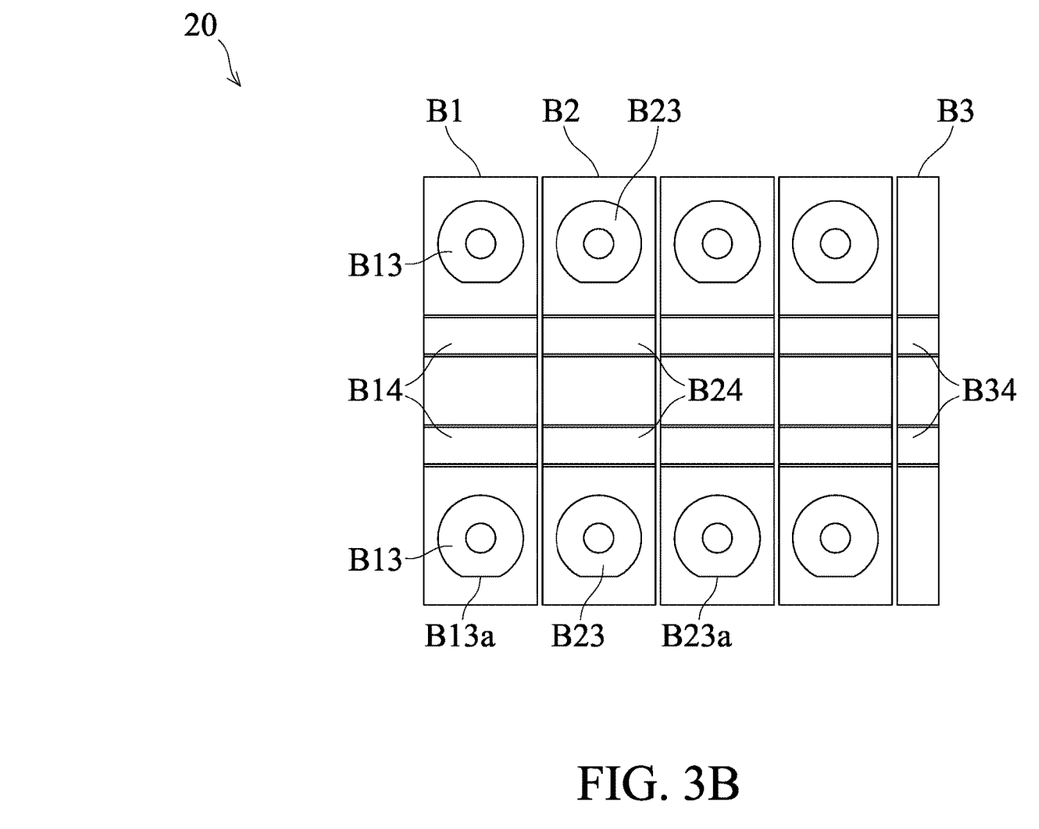
FIG. 3B is a bottom view of the moving module according to an embodiment of the invention.

Referring to FIGS. 3A and 3B, the moving module 20 comprises a plurality of movable blocks B1 and B2, a plate B3, and a plurality of locking members L1 and L2. The movable block B1 has at least one accommodating space B11, a connecting notch B12, a recess B13, and at least one protrusion B14. The movable block B2 has at least one accommodating space B21, a connecting notch B22, a recess B23, at least one protrusion B24, and at least one connecting portion B25. The plate B3 has at least one protrusion B34 and a connecting portion B35. The appearance and dimensions of the connecting portion B25 are substantially the same as that of the connecting portion B35, and the connecting notches B12 and B22 and the connecting portions B25 and B35 are complementary.

When the moving module 20 is assembled, the required components (such as the connectors C shown in FIGS. 4A-4D) can be firstly disposed in the accommodating spaces B11. Subsequently, the connecting portion B25 of the movable block B2 can be inserted into the connecting notch B12 of the movable block B1, and the locking member L1 can pass through the connecting portion B25 and the connecting notch B12. Therefore, the required components can be clamped. When the number of required components is increased, a plurality of movable blocks B2 can be disposed, and the required components can be disposed in the accommodating spaces B21 of the movable blocks B2. The connecting portion B25 of the movable block B2 can be inserted into the connecting notch B22 of the adjacent movable block B2, and the locking member L1 can pass through the connecting portion B25 and the connecting notch B22.

Finally, the connecting portion B35 of the plate B3 can be inserted into the connecting notch B22 of movable block B2 at the end of the alignment, and another locking member L1 can pass through the connecting portion B35 and the connecting notch B22.

The number of movable blocks B2 and the length of the moving module 20 can be adjusted as required. When the moving module 20 comprise a large number of movable blocks B2 and the length thereof is increased, a locking member L2 can be inserted into the movable blocks B1 and B2 and the plate B3 along the direction in which the movable blocks B2 are arranged.

As shown in FIGS. 1 and 3B, in this embodiment, the protrusion B14 of the movable block B1 is disposed between two recesses B13, and the protrusion B24 of the movable block B2 is disposed between two recesses B23. Each of the recesses B13 has a second positioning surface B13a, and each of the recesses B23 has a second positioning surface B23a. When the assembled movable blocks B1 and B2 and the plate B3 are disposed on the housing 10, the protrusions B14, B24 and B34 are aligned with each other and accommodated in the depression portion 12 of the housing 10, and the positions of the recesses B13 and B23 corresponds to the rail 11, wherein the depression portion 12 is parallel to the rail 11.

Referring to FIGS. 4A-4D, the steps of affixing the moving module 20 on the rail 11 of the housing 10 by the securing structure 30 is discussed below. The aforementioned figures illustrate two securing structures 30 respectively disposed on the left side and right side of the moving module 20, the members of these securing structures 30 has the same movement when using. It should be noted that, the frame 200 of the securing structure 30 on the left side is omitted for clarity.

Figure 4A:
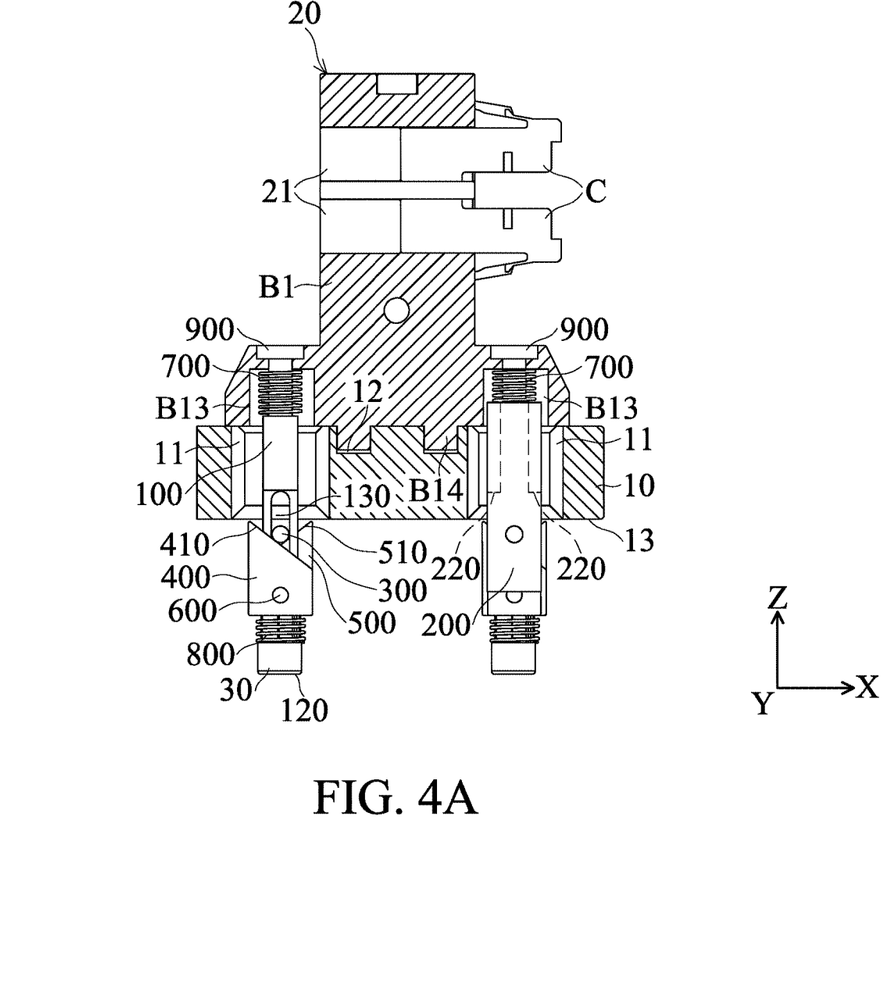
FIG. 4A is a schematic diagram illustrating that the movable member is in a first position relative to the screwing member according to an embodiment of the invention.

First, as shown in FIG. 4A, the screwing member 900 passes through the moving module 20 and the first elastic member 700, and is screwed into the threaded portion 110 of the movable member 100. At this time, the movable member 100 is in a first position relative to the screwing member 900. The frame 200 passes through the rail 11 and enters the recess B13 (or the recess B23) of the moving module 20, the fixed member 300 contacts the first inclined surface 410 of the first abutting member 400 and the second inclined surface 510 of the second abutting member 500, and a gap is formed between the bottom surface 13 of the housing 10 and the first and second abutting members 400 and 500. Therefore, when the movable member 100 is in the first position relative to the screwing member 900, the moving module 20 can move along the rail 11 of the housing 10.

It should be noted that, the appearance and the dimensions of the frame 200 is substantially corresponded to that of the recesses B13 and B23. Since the recesses B13 and B23 respectively has the second positioning surfaces B13a and B23a, the rotation of the securing structure 30 relative to the moving module 20 can be avoided when the frame 200 enters the recesses B13 or B23. Furthermore, a gap is formed between the frame 200 and the rail 11, so as to prevent the frame 200 and the rail 11 from wearing when the moving module 20 moves relative to the housing 10. Since the protrusions B14, B24 and B34 enter the depression portion 12 of the housing 10, there is no relative displacement between the moving module 20 and the housing 10 in X-axis, even if the gap is formed between the frame 200 and the rail 11. The moving module 20 can merely move along the rail 11.

Figure 4B:
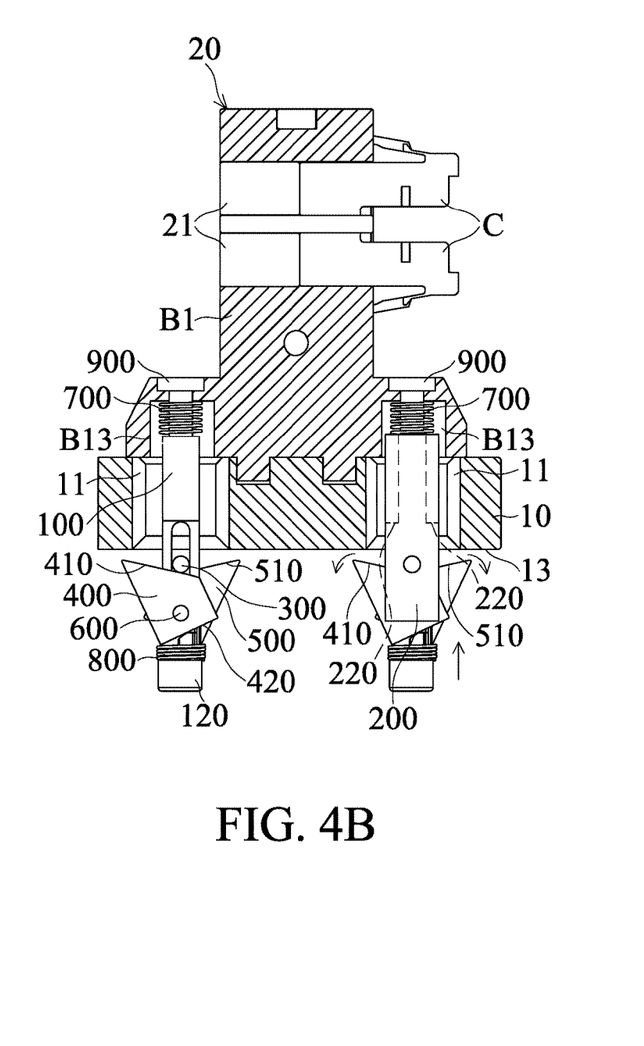
FIG. 4B is a schematic diagram illustrating that the fixed member pushes the first abutting member and the second abutting member to rotate according to an embodiment of the invention.
Figure 4C:
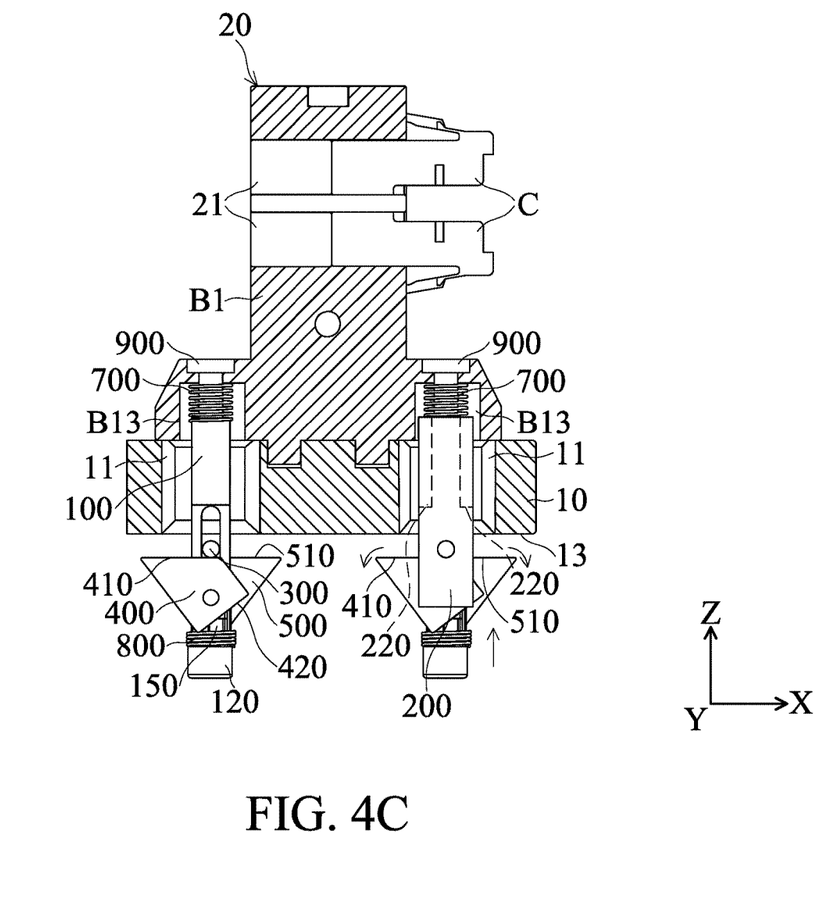
FIG. 4C is a schematic diagram illustrating that the movable member is in an intermediate position relative to the screwing member according to an embodiment of the invention.

Next, as shown in FIGS. 4B and 4C, the user can further screw the screwing member 900 into the threaded portion 110, and the movable member 100 can move relative to the screwing member 900 from the first position to an intermediate position. Due to the elastic force from the first elastic member 700, which connected to the moving module 20 and the frame 200, the frame 200 is temporarily fixed relative to the moving module 20. The fixed member 300 affixed on the frame 200 pushes the first abutting member 400 and the second abutting member 500, such that the first abutting member 400 and the second abutting member 500 rotate relative to the movable member 100, and the first inclined surface 410 and the second inclined surface 510 protrude from the openings 220. Since the first inclined surface 410 and the second inclined surface 510 slant to the opposite direction, the first abutting member 400 and the second abutting member 500 rotate along the opposite directions. For example, in this embodiment, the first abutting member 400 rotates along the counterclockwise direction (a first direction), and the second abutting member 500 rotates along the clockwise direction (a second direction).

Specifically, as shown in FIG. 4C, when the movable member 100 is in the intermediate position relative to the screwing member 900, the first inclined surface 410 of the first abutting member and the second inclined surface 510 of the second abutting member 500 are substantially parallel to the bottom surface 13 of the housing 13, and a gap is formed between the bottom surface 13 and the first and second inclined surfaces 410 and 510. The surfaces 420 and 520 of the first and second abutting members 400 and 500 contact the stopping portions 150, therefore, when the user further screws the screwing member 900 into the threaded portion 110, the first and second abutting member 400 and 500 are blocked by the stopping portions 150 and cannot rotate relative to the movable member 100. In other words, the rotation range of the first and second abutting members 400 and 500 are restricted by the stopping portions 150. Moreover, the second elastic member 800 can be compressed by the first and second abutting members 400 and 500.

Figure 4D:
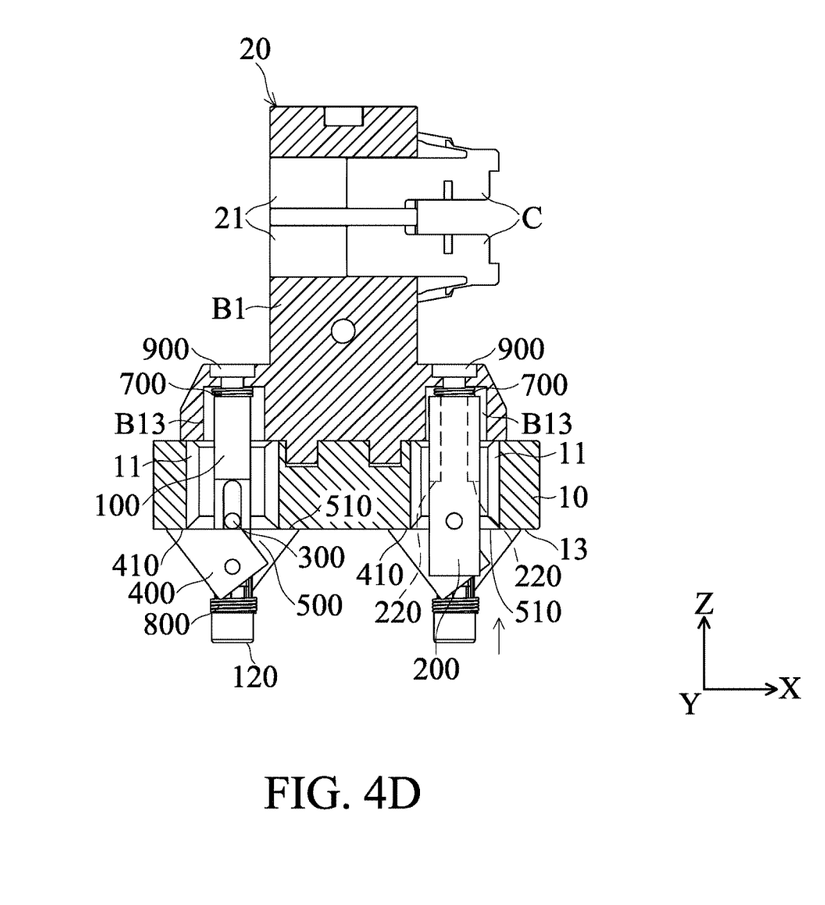
FIG. 4D is a schematic diagram illustrating that the movable member is in an second position relative to the screwing member according to an embodiment of the invention.

As shown in FIG. 4D, when the user further screws the screwing member 900 into the threaded portion 110, the movable member 100 moves relative to the screwing member 900 from the intermediate position to a second position. Since the first and second abutting members 400 and 500 cannot rotate relative to the movable member 100, the movable member 100 can drive the first and second abutting members 400 and 500 to move toward the housing 10, and the first inclined surface 410 and the second inclined surface 510 can contact the bottom surface 13 of the housing 10. Therefore, the moving module 20 can be affixed.

Furthermore, when the first and second abutting members 400 and 500 move toward the housing 10, they can push the fixed member 300, and the frame 200 can move relative to the moving module 20 and compresses the first elastic member 700.

When the user desires to move the moving module 20 again, the movable member 100 can move relative to the screwing member 900 from the second position to the first position. Thus, the first and second abutting members 400 and 500 are separated from the housing 100, and the moving module 20 can move along the rail 11. Simultaneously, the first abutting member 400 and the second abutting member 500 can rotate back to the positions shown in FIG. 4A respectively along the clockwise direction (the second direction) and the counterclockwise direction (the first direction) by the elastic force from the second elastic member 800.

Figure 5A:
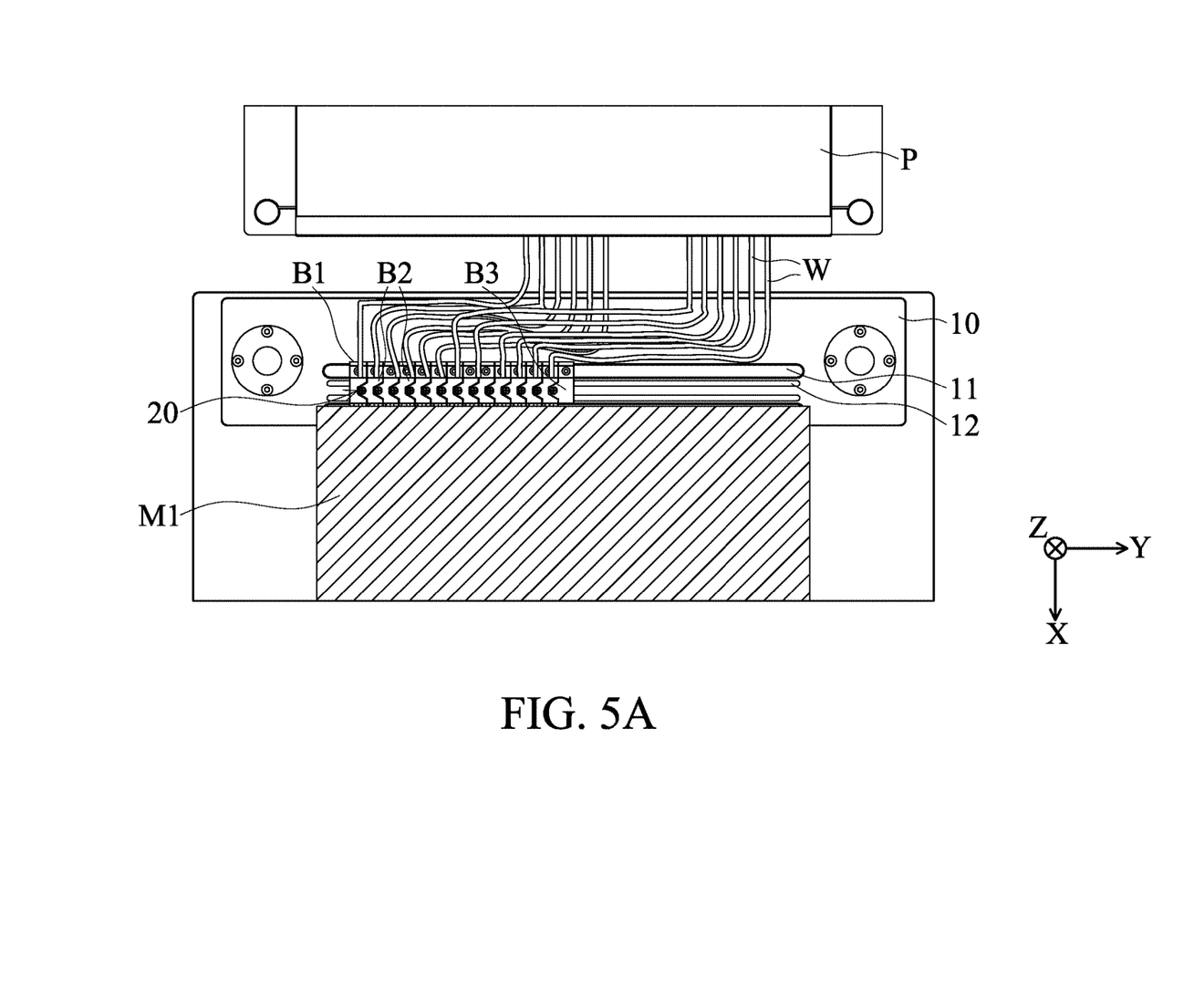
FIG. 5A is a schematic diagram illustrating that an electronic device is connected to an electronic apparatus by the sliding mechanism according to an embodiment of the invention.
Figure 5B:
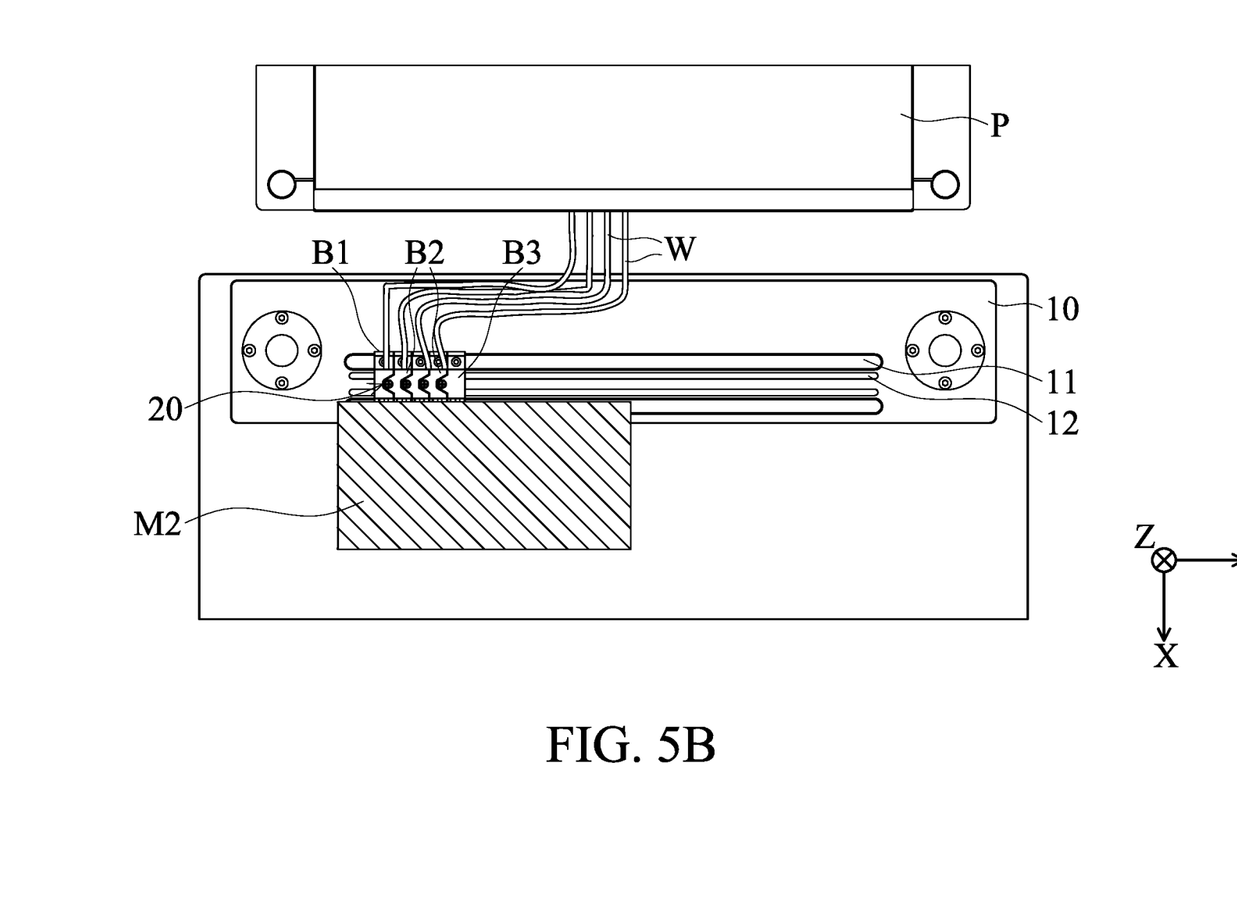
FIG. 5B is a schematic diagram illustrating that another electronic device is connected to the electronic apparatus by the sliding mechanism according to an embodiment of the invention.

As shown in FIGS. 5A and 5B, the connectors C on the moving module 20 can be connected to an electronic apparatus P via at least one wire W, and can be inserted into the connecting port of the electronic devices M1 and M2. When the electronic devices to be connected are different (such as the aforementioned electronic devices M1 and M2), the number and/or positions of the connectors are different. The number of movable blocks B2 and/or the position of the moving module 20 can be rapidly adjusted to match the electronic device.

In summary, a securing structure for affixing a moving module on a rail of a housing is provided. The securing structure includes a frame, a movable member, a fixed member, a first abutting member, and a screwing member. The frame is extended through the rail and includes a passage. The movable member is slidably disposed in the passage and includes a threaded portion and a guiding slot. The fixed member is affixed to the frame and extends through the guiding slot. The first abutting member has a first inclined surface and is pivotally connected to the movable member. The screwing member is extended through the moving module and detachably joined to the threaded portion. When the movable member is in a first position relative to the screwing member, the first inclined surface contacts the fixed member. When the movable member moves relative to the screwing member from the first position to a second position, the fixed member pushes the first abutting member to rotate along a first direction relative to the movable member, and the first inclined surface contacts the housing. The aforementioned securing structure can solve the problem wherein it is difficult to affix the moving module from the bottom when the space below the rail is limited.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A securing structure, comprising:
a frame, comprising a passage;
a movable member, slidably disposed in the passage and comprising a threaded portion and a guiding slot;
a fixed member, affixed to the frame and extending through the guiding slot;
a first abutting member, comprising a first inclined surface and pivotally connected to the movable member; and
a screwing member, detachably joined to the threaded portion.

2. The securing structure as claimed in claim 1, wherein the securing structure further comprises a first elastic member connected to the frame.

3. The securing structure as claimed in claim 1, wherein when the movable member moves relative to the screwing member from a first position to a second position, the fixed member pushes the first abutting member, and the first abutting member rotates relative to the movable member along a first direction.

4. The securing structure as claimed in claim 3, wherein the securing structure further comprises a second elastic member connected to the movable member and the first abutting member, wherein when the movable member moves relative to the screwing member from the second position to the first position, the first abutting member rotates along a second direction by an elastic force from the second elastic member, and the second direction is opposite to the first direction.

5. The securing structure as claimed in claim 1, wherein the movable member further comprises a stopping member for restricting the rotation range of the first abutting member.

6. The securing structure as claimed in claim 1, wherein the securing structure further comprises a second abutting member, comprising a second inclined surface and pivotally connected to the movable member, wherein when the movable member moves relative to the screwing member from a first position to a second position, the first abutting member rotates relative to the movable member along a first direction, and the second abutting member rotates relative to the movable member along a second direction opposite to the first direction.

7. The securing structure as claimed in claim 6, wherein the movable member is positioned between the first abutting member and the second abutting member.

8. The securing structure as claimed in claim 6, wherein the securing structure further comprises a second elastic member connected to the movable member and the second abutting member, wherein when the movable member moves relative to the screwing member from the second position to the first position, the second abutting member rotates along the first direction by an elastic force from the second elastic member.

9. The securing structure as claimed in claim 1, wherein the frame further comprises an opening, wherein when the abutting member rotates relative to the movable member along a first direction, the first inclined surface protrudes from the opening.

10. The securing structure as claimed in claim 1, wherein the movable member further comprises a first positioning surface for preventing the rotation of the movable member relative to the frame.

11. A sliding mechanism, comprising:
a housing, comprising a rail;
a moving module; and a securing structure as claimed in claim 1, wherein the frame is extended through the rail, and the screwing member is extended through the moving module.

12. The sliding mechanism as claimed in claim 11, wherein the moving module comprises a recess, and at least a portion of the frame enters the recess.

13. The sliding mechanism as claimed in claim 12, wherein the recess further comprises a second positioning surface for preventing the rotation of the frame relative to the moving module.

14. The sliding mechanism as claimed in claim 11, wherein the moving module comprises a protrusion, and the housing further comprises a depression portion, wherein the protrusion is accommodated in the depression portion.

15. The sliding mechanism as claimed in claim 14, wherein the depression portion is substantially parallel to the rail.

16. The sliding mechanism as claimed in claim 11, wherein the moving module comprises a plurality of movable blocks, detachably connected to each other.

17. The sliding mechanism as claimed in claim 11, wherein when the movable member moves relative to the screwing member from a first position to a second position, the first inclined surface contacts the housing.

18. The sliding mechanism as claimed in claim 17, wherein when the movable member moves relative to the screwing member from the first position to an intermediate position, the first inclined surface is substantially parallel to a bottom surface of the housing, and a gap is formed between the first inclined surface and the housing, wherein the intermediate position is positioned between the first position and the second position.

\* \* \* \* \*